(12) United States Patent
Karkos (10) Patent No.: US 11,015,451 B1
(45) Date of Patent: May 25, 2021

(54) AIRFOIL-MOUNTED PLATFORMS OF GAS TURBINE ENGINES

(71) Applicant: United Technologies Corporation, Farmington, CT (US)

(72) Inventor: Peter Karkos, Old Saybrook, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 9 days.

(21) Appl. No.: 16/674,238

(22) Filed: Nov. 5, 2019

(51) Int. Cl.
| | |
|---|---|
| *F01D 5/14* | (2006.01) |
| *F01D 11/00* | (2006.01) |
| *F01D 5/02* | (2006.01) |

(52) U.S. Cl.
CPC .............. *F01D 5/147* (2013.01); *F01D 5/02* (2013.01); *F01D 11/008* (2013.01); *F05D 2220/323* (2013.01); *F05D 2220/36* (2013.01); *F05D 2230/236* (2013.01); *F05D 2230/60* (2013.01); *F05D 2240/80* (2013.01)

(58) Field of Classification Search
CPC ... F01D 5/02; F01D 5/147; F01D 5/30; F01D 5/3053; F01D 5/3069; F01D 11/005; F01D 11/006; F01D 11/008; F05D 2220/36; F05D 2230/60; F05D 2240/80; F05D 2260/30; F05D 2260/36
See application file for complete search history.

(56) References Cited

U.S. PATENT DOCUMENTS

| | | | | |
|---|---|---|---|---|
| 4,501,053 | A | * | 2/1985 | Craig ..................... B23P 15/04 29/889.721 |
| 4,650,399 | A | | 3/1987 | Craig et al. |
| 9,017,033 | B2 | * | 4/2015 | Brown .................... F01D 5/147 416/193 A |
| 9,896,949 | B2 | * | 2/2018 | Robertson ............ F04D 29/324 |
| 2011/0142684 | A1 | | 6/2011 | Campbell et al. |
| 2013/0330196 | A1 | | 12/2013 | Brown et al. |
| 2014/0086751 | A1 | | 3/2014 | Bottome et al. |
| 2018/0283187 | A1 | | 10/2018 | Kray et al. |

FOREIGN PATENT DOCUMENTS

| | | |
|---|---|---|
| EP | 3287601 A1 | 2/2018 |
| EP | 3040513 B1 | 3/2018 |

OTHER PUBLICATIONS

Extended European Search Report for European Application No. 20205966.3, International Filing Date Nov. 5, 2020, dated Mar. 11, 2021, 5 pages.

* cited by examiner

*Primary Examiner* — David E Sosnowski
*Assistant Examiner* — Danielle M. Christensen
(74) *Attorney, Agent, or Firm* — Cantor Colburn LLP (57) ABSTRACT

Blade assemblies for gas turbine engines are described. The blade assemblies include a fan blade having a first tab extending from a leading edge and a second tab extending from a trailing edge. A first platform is affixed to a first side of the fan blade at the first and second tabs and a second platform is affixed to a second side of the fan blade at the first and second tabs. At least one first fastener is arranged to connect the first platform, the first tab, and the second platform at a first end and at least one second fastener is arranged to connect the first platform, the second tab, and the second platform at a second end.

20 Claims, 11 Drawing Sheets

AIRFOIL-MOUNTED PLATFORMS OF GAS TURBINE ENGINES

BACKGROUND

The subject matter disclosed herein generally relates to airfoil platforms used in gas turbine engines and, more particularly, to airfoil-mounted platforms.

Gas turbine engines generally include a fan section, a compressor second, a combustor section, and turbine sections positioned along a centerline referred to as an "axis of rotation." The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The fan section includes a rotor assembly and a stator assembly. The rotor assembly of the fan includes a hub and a plurality of outwardly extending rotor blades. Each rotor blade includes an airfoil portion, a dove-tailed root portion, and a platform. The airfoil portion extends through the flow path and interacts with the working medium gases to transfer energy between the rotor blade and working medium gases. The dove-tailed root portion engages attachment means of the hub. The platform typically extends circumferentially from the rotor blade to a platform of an adjacent rotor blade. The platform is disposed radially between the airfoil portion and the root portion. The stator assembly includes a fan case, which circumscribes the rotor assembly in close proximity to the tips of the rotor blades.

To reduce the size and cost of the rotor blades, the platform size may be reduced and a separate fan blade platform may be attached to the hub. To accommodate the separate fan blade platforms, outwardly extending tabs or lugs may be forged onto the hub to enable attachment of the platforms. Improved rotor systems and/or platforms may be advantageous.

SUMMARY

According to some embodiments, blade assemblies for gas turbine engines are provided. The blade assemblies include a fan blade having a leading edge, a trailing edge, a root, a tip, a first side, and a second side, the fan blade having a first tab extending from the leading edge proximate the root and a second tab extending from the trailing edge proximate the root. A first platform is affixed to the first side of the fan blade at the first tab and the second tab and extends in a direction from the leading edge to the trailing edge along the first side. A second platform is affixed to the second side of the fan blade at the first tab and the second tab and extends in a direction from the leading edge to the trailing edge along the first side. At least one first fastener connects the first platform, the first tab, and the second platform and at least one second fastener connecting the first platform, the second tab, and the second platform.

In addition to one or more of the features described above, or as an alternative, further embodiments of the blade assemblies may include that the fan blade defines a mounting region extending from the first tab to the second tab on each of the first side and the second side.

In addition to one or more of the features described above, or as an alternative, further embodiments of the blade assemblies may include that a friction retention interface is formed between the fan blade at the mounting region and a contact surface of the first platform on the first side.

In addition to one or more of the features described above, or as an alternative, further embodiments of the blade assemblies may include that a bonding retention interface is formed between the fan blade at the mounting region and a contact surface of the first platform on the first side.

In addition to one or more of the features described above, or as an alternative, further embodiments of the blade assemblies may include that the bonding interface includes an epoxy to bond a material of the first platform member to the first side of the fan blade.

In addition to one or more of the features described above, or as an alternative, further embodiments of the blade assemblies may include that the mounting region of the fan blade comprises a smooth surface.

In addition to one or more of the features described above, or as an alternative, further embodiments of the blade assemblies may include that the mounting region of the fan blade comprises at least one rib configured to engage with a contact surface of the first platform member.

In addition to one or more of the features described above, or as an alternative, further embodiments of the blade assemblies may include that at least one of (i) the first platform member defines a geometry different than a geometry of the first side of the fan blade such that a pre-load is defined by the first platform member and (ii) the second platform member defines a geometry different than a geometry of the second side of the fan blade such that a pre-load is defined by the second platform member.

In addition to one or more of the features described above, or as an alternative, further embodiments of the blade assemblies may include a stiffening rib attached to the first platform member.

In addition to one or more of the features described above, or as an alternative, further embodiments of the blade assemblies may include that the at least one first fastener is at least one of a bolt, a snap bolt, a preload washer, and a crimped metal band.

In addition to one or more of the features described above, or as an alternative, further embodiments of the blade assemblies may include that an end of the first platform member proximate the first tab includes a retention snap end configured to engage with an end of the second platform member proximate the first tab such that the first tab is disposed between the end of the first platform member and the end of the second platform member.

In addition to one or more of the features described above, or as an alternative, further embodiments of the blade assemblies may include a seal attached to at least one of the first platform member and the second platform member.

According to some embodiments, gas turbine engines are provided. The gas turbine engines include a hub and a blade assembly mounted to the hub. The blade assembly includes a fan blade having a leading edge, a trailing edge, a root, a tip, a first side, and a second side, the fan blade having a first tab extending from the leading edge proximate the root and a second tab extending from the trailing edge proximate the root. A first platform is affixed to the first side of the fan blade at the first tab and the second tab and extends in a direction from the leading edge to the trailing edge along the first side. A second platform is affixed to the second side of the fan blade at the first tab and the second tab and extends in a direction from the leading edge to the trailing edge along the first side. At least one first fastener connects the first platform, the first tab, and the second platform and at least one second fastener connects the first platform, the second tab, and the second platform.

In addition to one or more of the features described above, or as an alternative, further embodiments of the gas turbine engines may include a plurality of additional blade assemblies distributed about a circumference of the hub.

In addition to one or more of the features described above, or as an alternative, further embodiments of the gas turbine engines may include a seal attached to at least one of the first platform member and the second platform member, wherein the seal provides a seal between the blade assembly and an adjacent one of the plurality of additional blade assemblies.

In addition to one or more of the features described above, or as an alternative, further embodiments of the gas turbine engines may include that the fan blade defines a mounting region extending from the first tab to the second tab on each of the first side and the second side.

In addition to one or more of the features described above, or as an alternative, further embodiments of the gas turbine engines may include that at least one of (i) a friction retention interface is formed between the fan blade at the mounting region and a contact surface of the first platform on the first side and (ii) a bonding retention interface is formed between the fan blade at the mounting region and a contact surface of the first platform on the first side.

In addition to one or more of the features described above, or as an alternative, further embodiments of the gas turbine engines may include a stiffening rib attached to the first platform member.

In addition to one or more of the features described above, or as an alternative, further embodiments of the gas turbine engines may include that the at least one first fastener is at least one of a bolt, a snap bolt, a preload washer, and a crimped metal band.

In addition to one or more of the features described above, or as an alternative, further embodiments of the gas turbine engines may include that an end of the first platform member proximate the first tab includes a retention snap end configured to engage with an end of the second platform member proximate the first tab such that the first tab is disposed between the end of the first platform member and the end of the second platform member.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Detailed descriptions of one or more embodiments of the disclosed apparatus and/or methods are presented herein by way of exemplification and not limitation with reference to the Figures.

Figure 1:
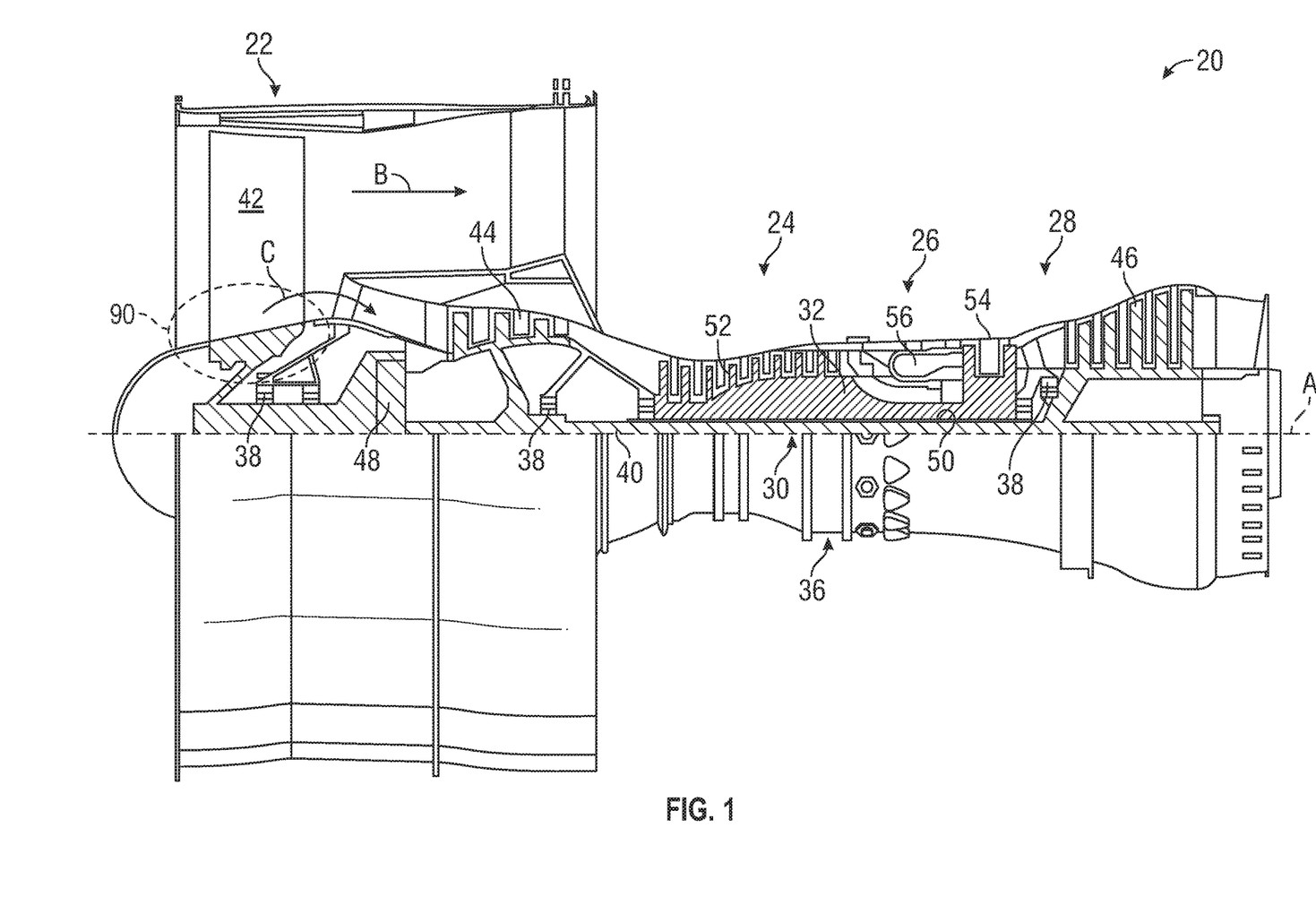
FIG. 1 is a schematic cross-sectional illustration of a gas turbine engine.

FIG. 1 schematically illustrates a gas turbine engine 20. The gas turbine engine 20 is disclosed herein as a turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets and turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
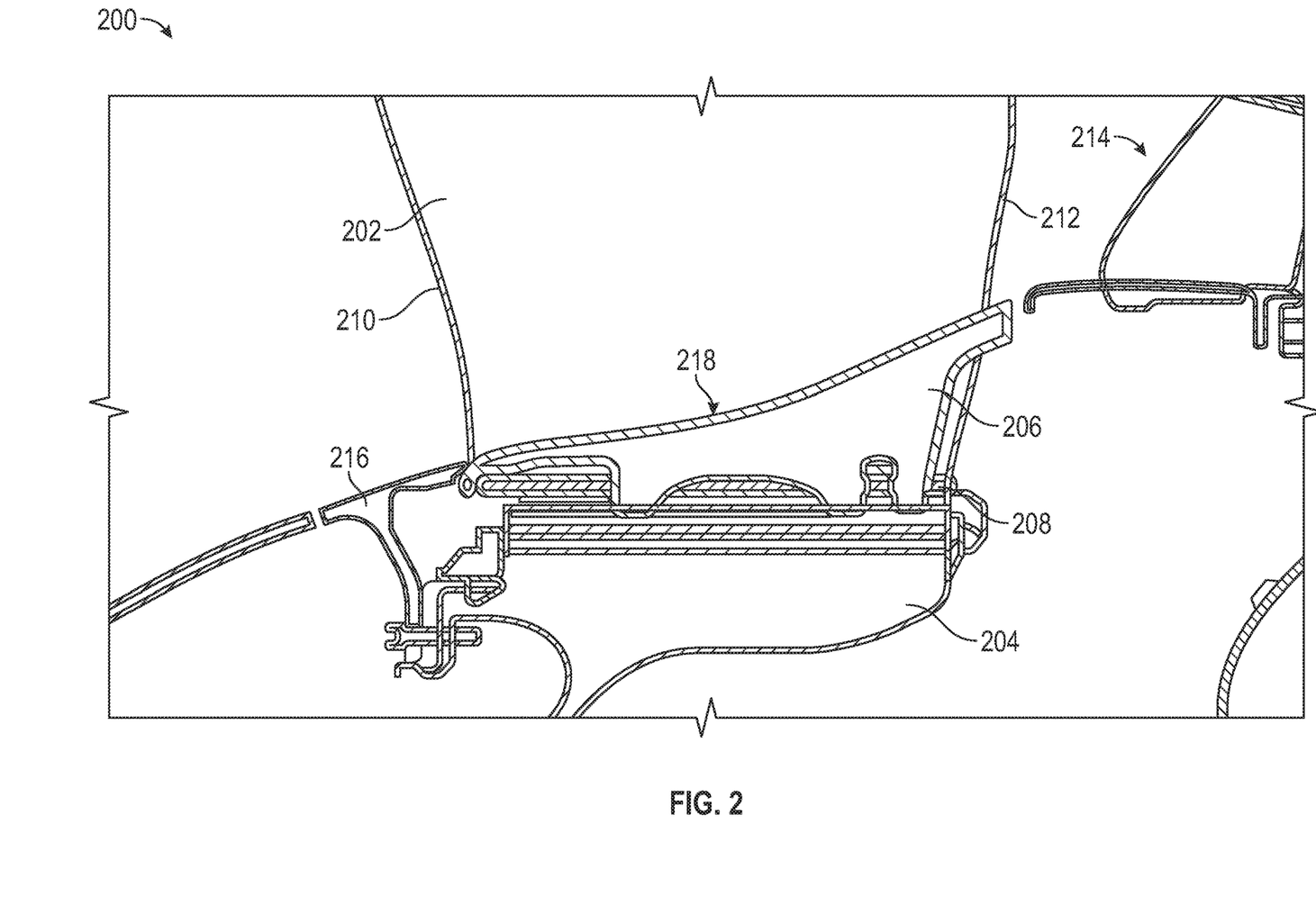
FIG. 2 is a schematic illustration of a portion of a fan section of the gas turbine engine that may employ embodiments of the present disclosure.

FIG. 2 is a schematic view of a portion of a fan section 200 that may employ various embodiments disclosed herein (e.g., region 90 shown in FIG. 1). Fan section 200 includes a plurality of airfoils, including, for example, one or more fan blades 202 (generically an "airfoil"). The airfoils 202 may be hollow bodies with internal cavities defining a number of channels or cavities, may be hollow, or may be solid-body. The airfoils 202 may be mounted or attached to a hub 204 that is mounted to or part of a gas turbine engine (e.g., as shown in FIG. 1). In this illustration, located between adjacent airfoils 202 are a plurality of platforms 206. The platforms 206 may be attached to the hub 204 by one or more locking pins 208. The airfoils 202 may be similarly attached to the hub 204 by one or more locking pins or other attachment mechanisms, as will be appreciated by those of skill in the art. The airfoil extends in a generally axial direction (i.e., with respect to an engine axis) from a leading edge 210 to a trailing edge 212.

The fan section 200 is housed within a case of a gas turbine engine, which may have multiple parts (e.g., fan case, turbine case, diffuser case, etc.). In various locations, components, such as seals, may be positioned between the airfoils 202 and the fan case. For example, as appreciated by those of skill in the art, blade outer air seals ("BOAS") may be arranged radially outward from a tip of the airfoil 202. As will be appreciated by those of skill in the art, the BOAS can include BOAS supports that are configured to fixedly connect or attach the BOAS to the fan case (e.g., the BOAS supports can be located between the BOAS and the fan case). As the airfoils 202 are rotated within the fan case, the airfoils 202 will direct air in a radially aftward direction and into an engine inlet 214, with at least a portion of such air being directed to compressor and turbine sections of a gas turbine engine (e.g., as shown in FIG. 1).

The hub 204 is rotatable within a gas turbine engine, and may be rotated relative to a stationary portion of the engine (e.g., the engine inlet 214). Forward of the hub 204 (and the airfoil 202 and the platform 206) may be a spinner 216, as will be appreciated by those of skill in the art. The spinner 216 may rotate with rotation of the fan section 200 and streamline airflow into the fan section 200. The incoming air is driven aftward by the airfoils 202 and flows along a flow or gaspath surface 218 of the platforms 206 arranged between adjacent airfoils 202 arranged about a circumference of the hub 204.

Figure 3A:
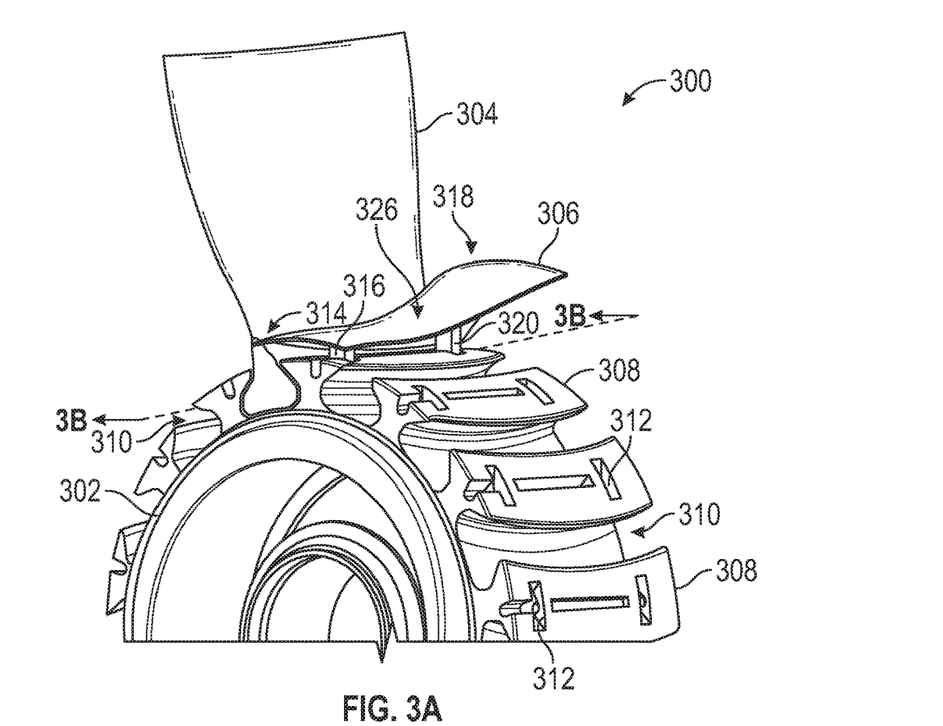
FIG. 3A is a schematic illustration of a hub assembly that may employ embodiments of the present disclosure.
Figure 3B:
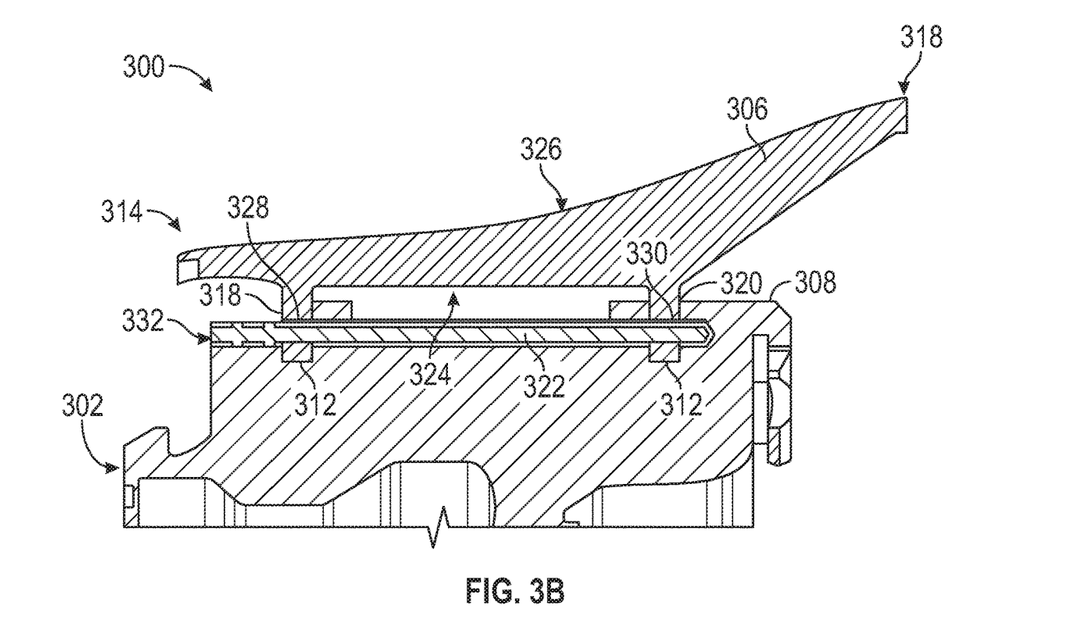
FIG. 3B is a cross-sectional illustration of a portion of the hub assembly of FIG. 3A as viewed along the line 3B-3B.

Turning now to FIGS. 3A-3B, schematic illustrations of a hub assembly 300 of a gas turbine engine are shown. FIG. 3A is an isometric illustration of the hub assembly 300 and FIG. 3B is a cross-sectional view of the hub assembly 300 as viewed along the line 3B-3B of FIG. 3A. The hub assembly 300, as shown, includes a hub 302, a fan blade 304, and a platform 306. The fan blade 304 may be a fan blade (e.g., for fan section 22 shown in FIG. 1) or a turbine blade (e.g., for a compressor section 24 or turbine section 28 shown in FIG. 1). Although shown with a single fan blade 304 and a single platform 306, those of skill in the art will appreciate that a number of blades and platforms are to be installed to the hub 302 when installed into a gas turbine engine. Further, although a specific configuration and arrangement of elements is shown, those of skill in the art will appreciate that alternative arrangements are possible without departing from the scope of the present disclosure. That is, the present illustrations and discussion are merely for illustrative and explanatory purposes and are not intended to be limiting.

The hub assembly 300 may be installed within a fan section of a gas turbine engine. As shown, the hub 302 includes at least one attachment lug 308. The fan blade 304 is installed between two adjacent attachment lug 308 within a blade cavity 310. During installation of the fan section, the platform 306 is operably coupled to each of the attachment lug 308. As shown, each of the attachment lug 308 may include one or more slots 312 that are configured to receive a portion of a respective platform 306. For example, as shown, a front end 314 of the platform 306 may include a first connector 316 that may engage within a respective slot 312, and at rear end 318 of the platform 306, a second connector 320 may engage with a respective slot 312. A locking pin 322 may be used to provide removable attachment between the platform 306 and the attachment lug 308.

The first connector 316 and the second connector 320 extend from a non-gaspath surface 324 of the platform 306, as will be appreciated by those of skill in the art. Opposite the non-gaspath surface 324 of the platform 306 is a gaspath surface 326, which may be contoured as appreciated by those of skill in the art. Each of the connectors 316, 320 include securing elements 328, 330, respectively, defining apertures for attachment. To secure the platform 306 to a respective attachment lug 308, the first connector 316 is inserted into a respective slot 312 at the front end 314 and the second connector 320 is inserted into a respective slot 312 at the rear end 318. The locking pin 322 is inserted through an attachment aperture 332 to pass through each of the securing elements 328, 330 of the platform 306 and thus through the first connector 316 and the second connector 320.

As shown in FIGS. 3A-3B, the platform 306 is a separate component of the hub-rotor assembly, with the locking pin 322 functioning as a retention feature. The sides of the platform 306 may be configured with seals to prevent air leakage, with such seals arranged at the interface or space between an edge of the platform 306 and a side of the fan blade 304. The platform 306 is configured to guide air into a core compressor inlet of a gas turbine engine, and prevent air from leaking beneath the flow surface of the platform 306. Platforms are typically made from light materials and minimal use thereof such that the platforms do not impact overall weight and/or to minimize impact if a fan blade out event occurs. Given that each rotor-blade configuration may be unique, a unique and specific platform may be required for each rotor or engine design, which may impact costs and development time thereof.

Embodiments of the present disclosure are directed to eliminating the rotor-mounted platforms and providing for a fan blade-mounted platform. Advantageously, such configuration may address concerns related to manufacturing, weight, fan blade designs, etc. In accordance with some embodiments of the present disclosure, two platform members are arranged on opposing sides of a fan blade and are fixedly attached to each other and one or more tabs of the fan blade. In some embodiments, one or more mechanisms for attaching or mounting the platform members to the fan blade may be employed. For example, attachment may be provided by fasteners, snap retention, crimp or clip retention, bonding, etc.

Figure 4A:
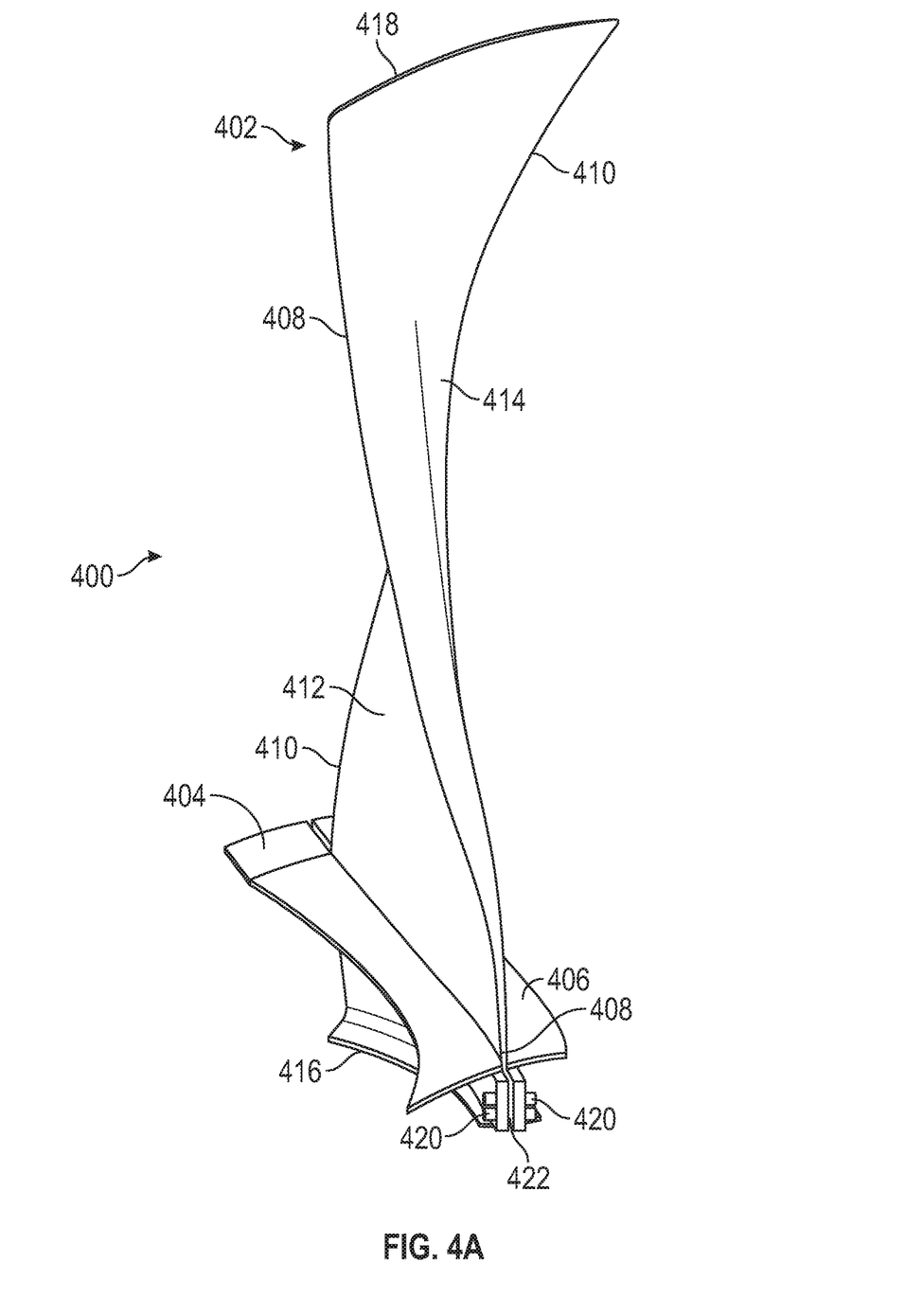
FIG. 4A is a leading edge, isometric illustration of a blade assembly in accordance with an embodiment of the present disclosure.
Figure 4B:
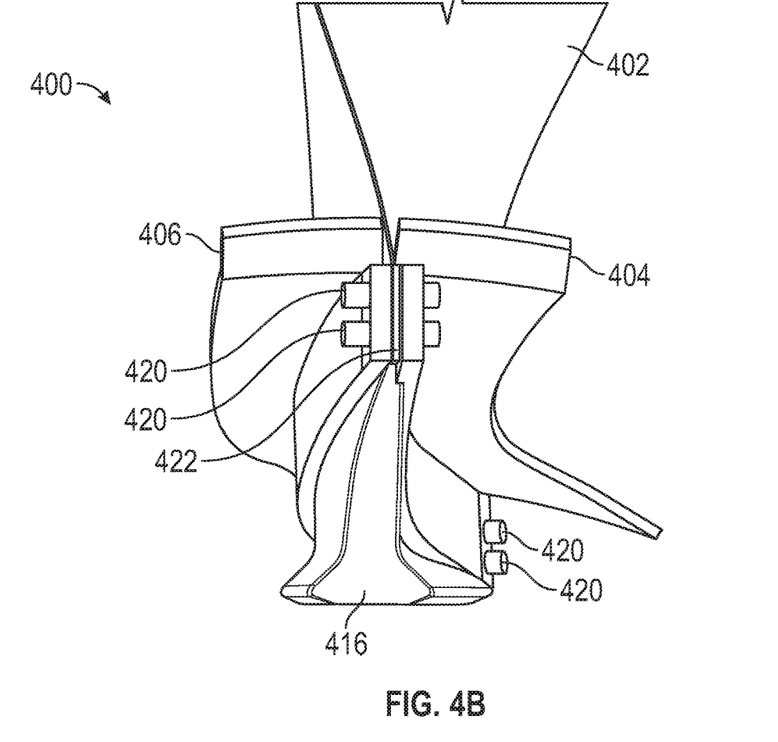
FIG. 4B is an enlarged trailing edge, elevation illustration of the blade assembly of FIG. 4A.
Figure 4C:
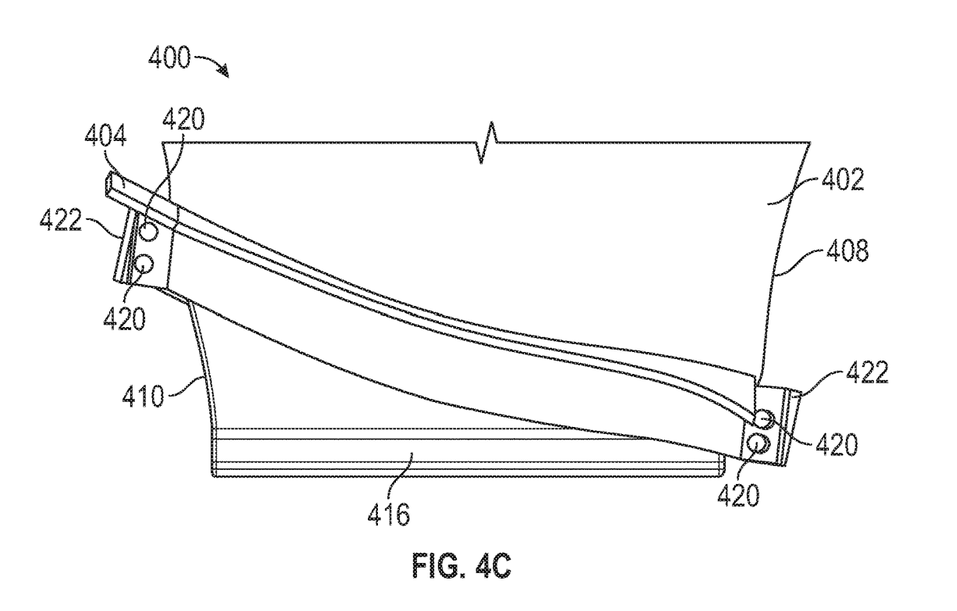
FIG. 4C is a side elevation illustration of the blade assembly of FIG. 4A.

Turning now to FIGS. 4A-4C, schematic illustrations of a blade assembly 400 in accordance with an embodiment of the present disclosure are shown. FIG. 4A is a leading edge, isometric illustration of the blade assembly 400, FIG. 4B is an enlarged trailing edge, elevation illustration of the blade assembly 400, and FIG. 4C is a side elevation illustration of the blade assembly 400. The blade assembly 400 is configured to be installed to, mounted in, or otherwise attached to a rotor for installation within a gas turbine engine, as described above.

The blade assembly 400 includes a fan blade 402, a first platform member 404, and a second platform member 406, with the first and second platform members 404, 406 mounted or attached to the fan blade 402 on opposite sides of the fan blade 402. The fan blade 402 has a leading edge 408, a trailing edge 410, a first side 412, and a second side 414. When installed within a gas turbine engine, the leading edge 408 is generally forward of the trailing edge 410, with a gaspath flowing in a direction from the leading edge 408 to the trailing edge 410. The first and second sides 412, 414 of the fan blade 402 are airfoil surfaces that extend between the leading edge 408 and the trailing edge 410. The fan blade 402 may extend in a generally radial direction (i.e., relative to an engine axis when installed in a gas turbine engine) from a root 416 at a radially inward end to a tip 418 at a radially outward end. The root 416 is configured for installation and/or attachment to a hub.

The first platform member 404 is mounted or attached to the fan blade 402 on the first side 412 and the second platform member 406 is mounted or attached to the fan blade 402 on the second side 414. The first platform member 404 is attached, in this embodiment, to the second platform member 406 by a plurality of fasteners 420. Further, the fasteners 420 are configured to directly connect and attach the first platform member 404 and the second platform member 406 to the fan blade 402. The connection may be proximate both the leading edge 408 and the trailing edge 410 through one or more blade engagement tabs 422. That is, the fan blade 402 may include one or more blade engagement tabs 422 that extend from the shape or geometry of the fan blade 402, proximate the root 416, at one or both of the leading edge 408 and the trailing edge 410 and include apertures or other structure to receive the fasteners 420 and allow for fixed engagement of the three parts together (i.e., the blade engagement tab 422, a portion of the first platform member 404, and a portion of the second platform member 406).

Accordingly, the platforms of the present disclosure of a two-part constructions, with the two platform members 404, 406 being directly mounted and attached to a specific fan blade 402. The joining or coupling of the three components may be by multiple mechanisms, including, but not limited to, bolted or other fastener connection, friction retention, and/or bonding retention (e.g., epoxy). The fastener connection provides for a direct, mechanical joining between the separate components. The friction retention is provided between surfaces of the platform members and the exterior surfaces of the fan blade. The bonding retention may provide for a material or chemical bonding between the material of the platform members and the body or surfaces of the fan blade.

Figure 5A:
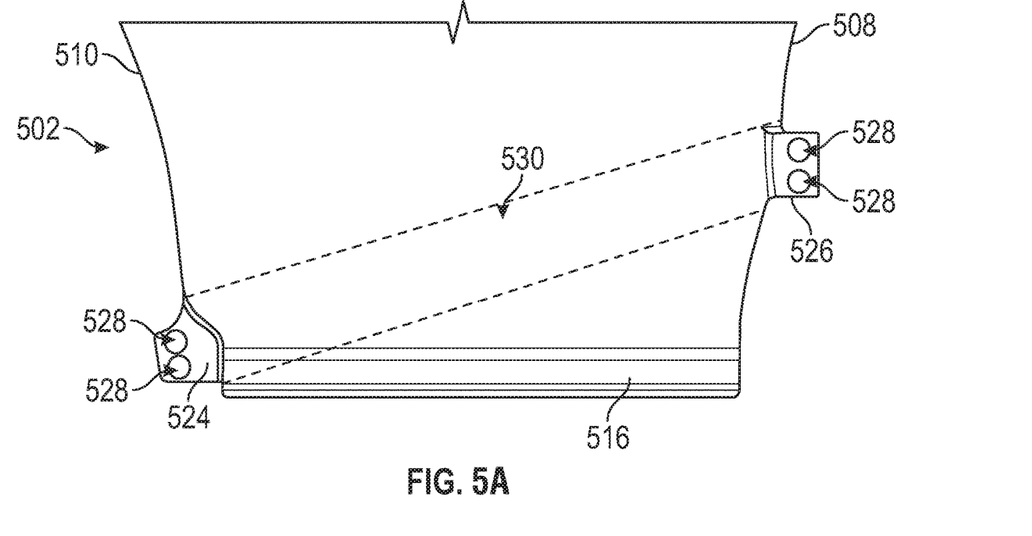
FIG. 5A is a side elevation illustration of a blade of a blade assembly in accordance with an embodiment of the present disclosure.

FIG. 5 is a schematic illustration of a fan blade 502 that may be configured to have platform members mounted thereto, in accordance with an embodiment of the present disclosure. Specifically, FIG. 5 illustrates the fan blade 502 without the platform members mounted thereto. FIG. 5 is an enlarged side view elevation of the fan blade 502 proximate a root 516 of the fan blade 502.

Figure 5B:
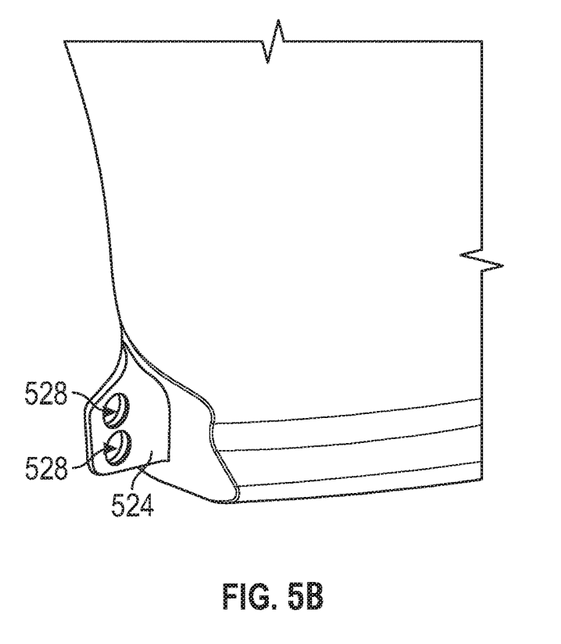
FIG. 5B is an enlarged illustration of a leading edge portion of the blade of FIG. 5A.
Figure 5C:
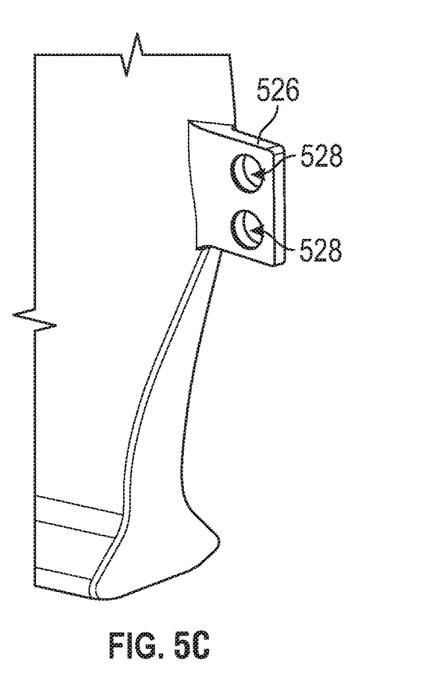
FIG. 5C is an enlarged illustration of a trailing edge portion of the blade of FIG. 5A.

As shown, the fan blade 502 includes a first tab 524 located proximate the root 516 and arranged along a leading edge 508 of the fan blade 502. Similarly, in this embodiment, the fan blade 502 includes a second tab 526 located proximate the root 516 and arranged along a trailing edge 510 of the fan blade 502. The tabs 524, 526 each include respective apertures 528 or through-holes to receive a fastener and enable mounting or attachment of platform members to the fan blade 502. The tabs 524, 526 may be formed from the same material of the fan blade 502 and are forward (from leading edge 508) and aft (from trailing edge 510) extensions of the material of the fan blade 502. Further, in some embodiments, the tabs described herein may be welded to the fan blade, or otherwise attached thereto.

As shown, a mounting region 530 is defined as extending from the first tab 524 to the second tab 526 along an exterior surface of the fan blade 502. The mounting region 530 is configured to engage with and contact a surface of a mounted platform member (e.g., an interior or inner facing surface of the platform member). In some embodiments, the mounting region 530 may be smooth or substantially smooth with no features thereon. In such configurations, a platform member may be in contact with all parts of the mounting region 530. In other embodiments, the mounting region 530 may include one or more mounting features, such as a roughened surface, ribs, or other structures and/or texture to provide for increased securing of the platform member to the fan blade 502. For example, such ribbed structure for engagement between the platform members and the fan blade is shown and described in U.S. Pat. No. 9,896,949, entitled "Bonded Fan Platform," issued on Feb. 20, 2018, assigned to the present Applicant; the contents of which are incorporated herein in their entirety. In some embodiments, the apertures 528 may be reinforced with a grommet or other similar structure.

Figure 6:
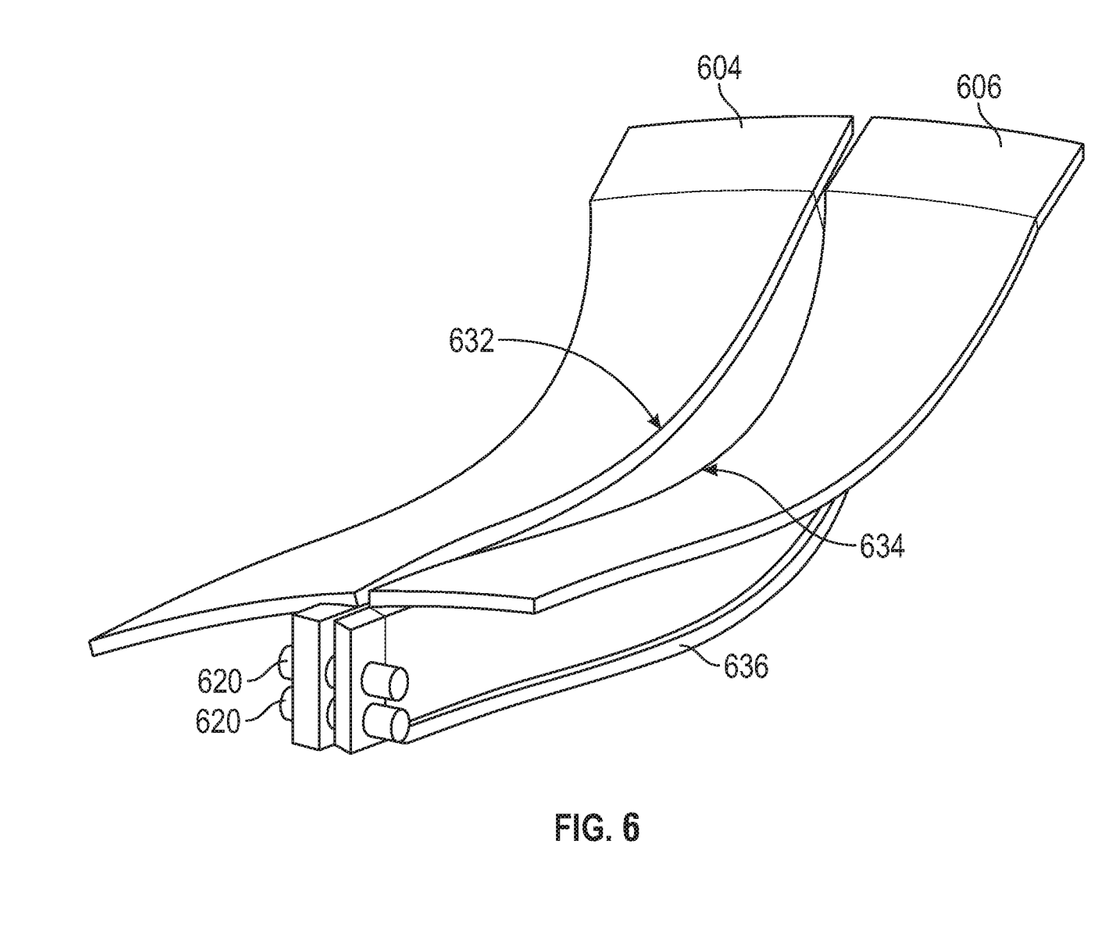
FIG. 6 is an isometric illustration of platform members of a blade assembly in accordance with an embodiment of the present disclosure.

Turning now to FIG. 6, a schematic illustration of two platform members 604, 606 arranged without the fan blade are shown. The platform members 604, 606 are configured to be installed on opposite sides of a fan blade and may be connected to each other and the fan blade (e.g., through tabs of the fan blade). A first platform member 604 may be arranged on a first side of a fan blade and a second platform member 606 may be arranged on a second side of the fan blade and opposite the first side/first platform member 604. The two platform members 604, 606 may be connected by one or more fasteners 620, such as bolts or rivets, although other types of fasteners are contemplated without departing from the scope of the present disclosure.

As shown, the first platform member 604 includes a respective contact surface 632 and the second platform member 606 includes a respective contact surface 634. The contact surfaces 632, 634 are contoured to enable engagement with a surface of the fan blade (e.g., a mounting surface as shown in FIG. 5). The geometry and contour of the contact surfaces 632, 634 may be selected and configured to engage with the mounting region/surface of the fan blade, at least when the fasteners 620 are fixedly engaged and securing the two platform members 604, 606 to the fan blade. As such, prior to installation and mounting, the geometry of the platform members 604, 608 may be selected to provide for a pre-load at the point of connection (e.g., between the fan blade tabs and the ends of the platform members).

Also shown in FIG. 6 is a stiffening rib 636 that may be connected to or attached to one or both of the platform members 604, 606. The stiffening rib 636 may be provide to increase a stiffness or rigidity of the assembled structure (i.e., the platform members mounted to a fan blade). The stiffening rib 636 may be attached by brazing, welding, adhesives, mechanical fixture (e.g., fastener), or other attachment means/mechanism, as will be appreciated by those of skill in the art.

Figure 7:
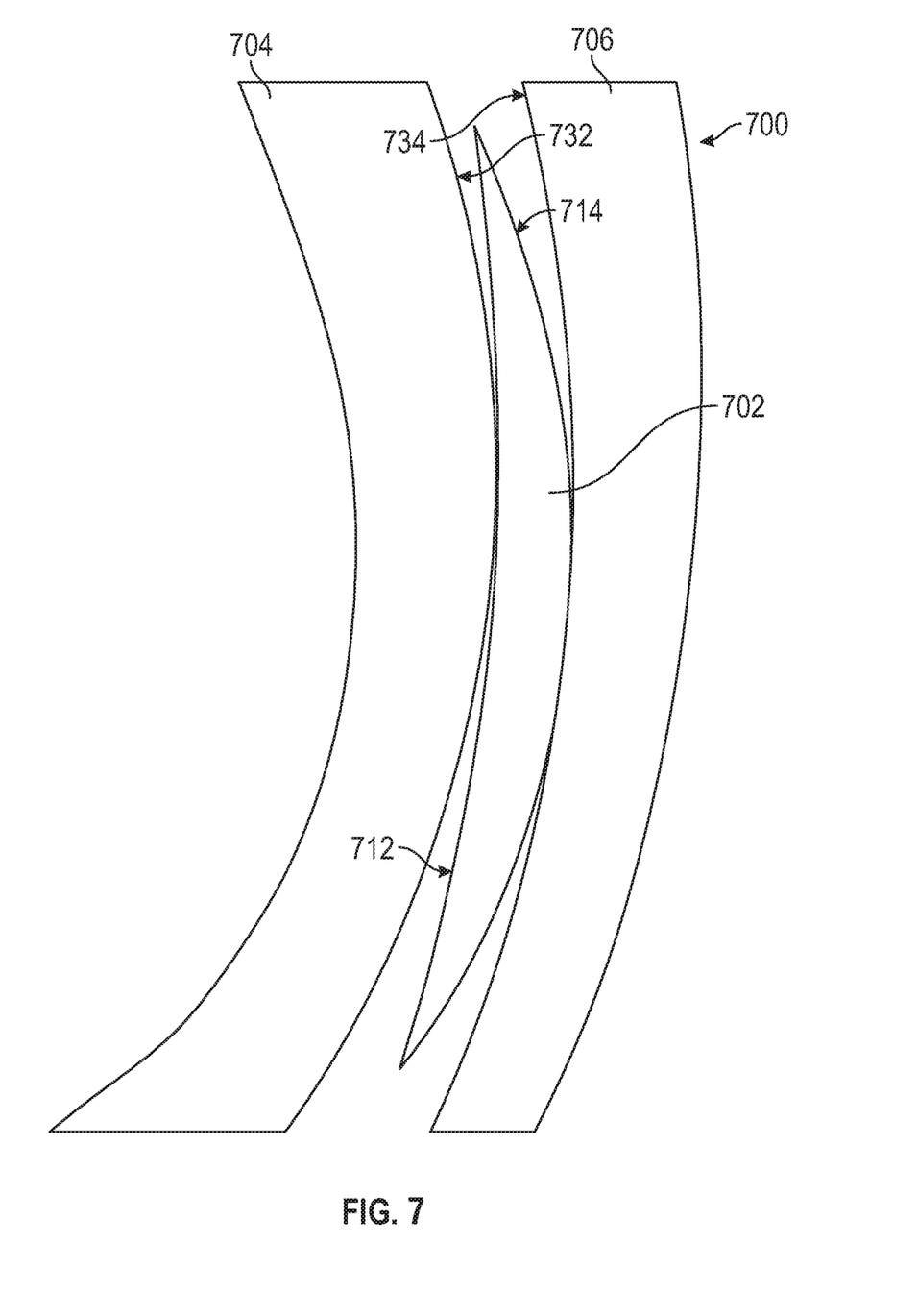
FIG. 7 is a top-down plan view illustration of a blade assembly in accordance with an embodiment of the present disclosure.

Turning now to FIG. 7, a top down plan view of a blade assembly 700 before mounting is shown. As illustrated, two platform members 704, 706 are arranged adjacent to a fan blade 702, and arranged on opposite sides of the fan blade 702. The fan blade 702, first platform member 704, and second platform member 706 may be arranged and configured as discussed above. As shown the first platform member 704 is arranged proximate a first side 712 of the fan blade 702 and the second platform member 706 is arranged proximate a second side 714 of the fan blade 702. The first platform member 704 has a respective contact surface 732 that faces the fan blade 702 on the first side 712 and is arranged to contact the fan blade 702 along a mounting region on the first side 712 of the fan blade 702. The second platform member 706 has a respective contact surface 734 that faces the fan blade 702 on the second side 714 and is arranged to contact the fan blade 702 along a mounting region on the second side 714 of the fan blade 702. As shown, a geometry or contour of the contact surface 732 of the first platform member 704 is different than the geometry or contour of the first side 712 of the fan blade 702 and a geometry or contour of the contact surface 734 of the second platform member 706 is different than the geometry or contour of the second side 714 of the fan blade 702. These differences in geometry or contour of the platform members 704, 706 relative to the fan blade 702 ensure uniform frictional contact along the length of the fan blade 712 when the first and second platform members 704, 706 are joined together by one or more fasteners through tabs of the fan blade 702, as described above.

Figure 8:
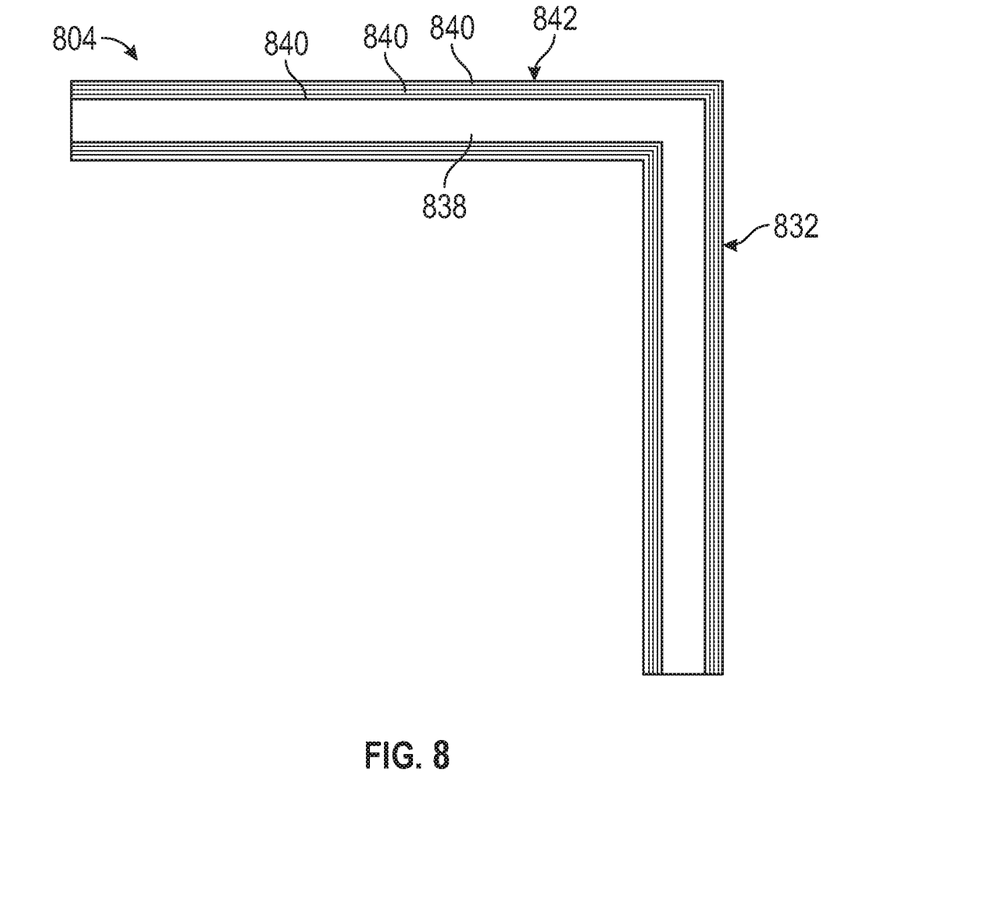
FIG. 8 is a cross-sectional illustration of a platform member in accordance with an embodiment of the present disclosure.

Turning now to FIG. 8, a schematic cross-sectional illustration of a platform member 804 illustrating an interior construction thereof is shown. The platform member 804 may be similar to that shown and described above. In this illustrative constructions, the platform member 804 is formed from a core 838 that is wrapped by one or more plys 840. The core 838 may be a metallic core (e.g., aluminum) or a foam core, and may have a honeycomb structure to enable reduced weight and other properties. The plys 840 may be carbon fiber plys that define surfaces of the platform member 804, including a contact surface 832 for engaging with a surface of a fan blade and an airflow surface 842, with the airflow surface 842 arranged between adjacent fan blades on a hub when installed within a gas turbine engine. The contact surface 832 of the platform member 804 may be a smooth surface.

Figure 9:
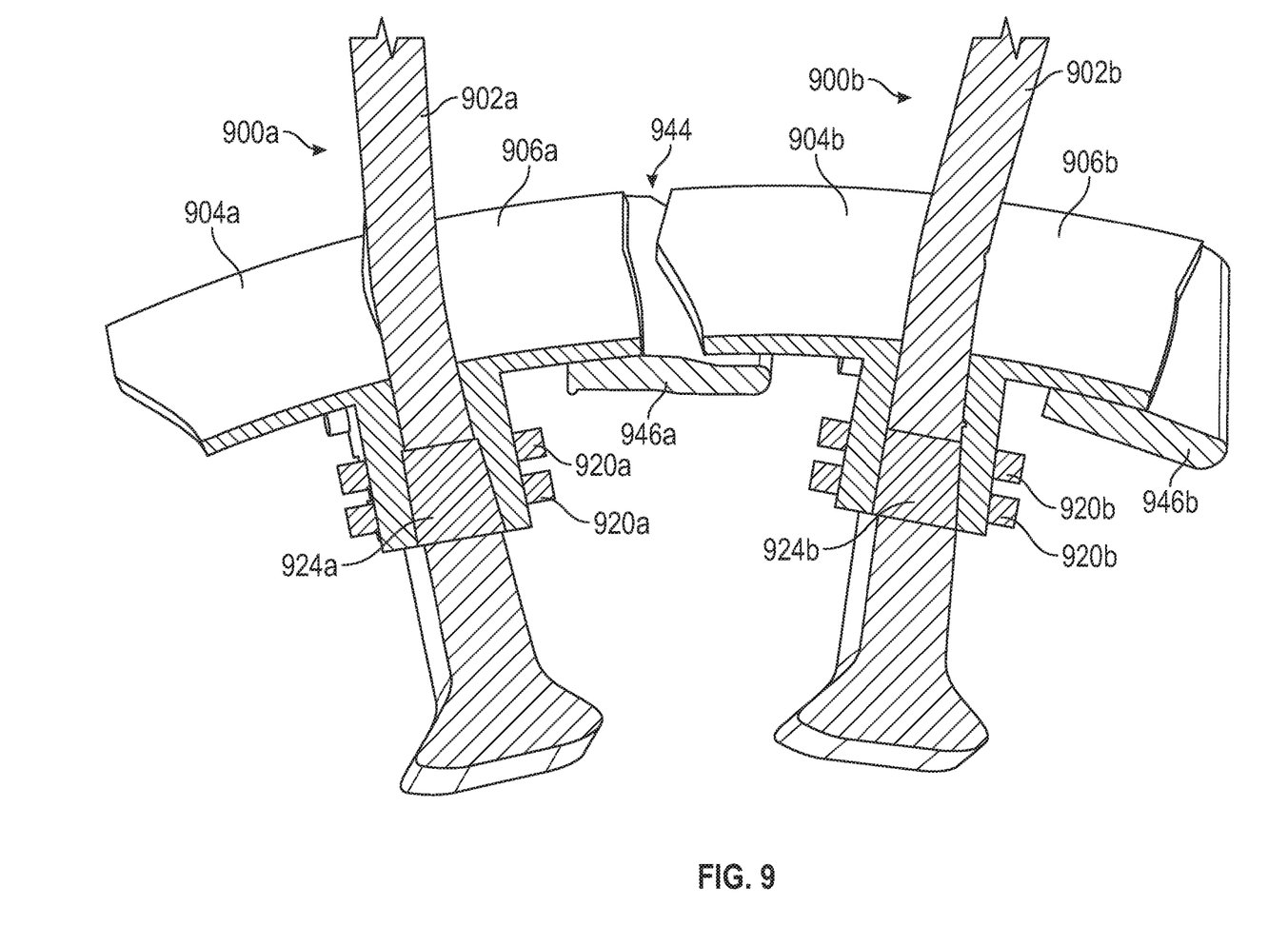
FIG. 9 is an illustration of multiple platform assemblies arranged in accordance with an embodiment of the present disclosure.

Turning now to FIG. 9, a schematic illustration of two adjacent blade assemblies 900a, 900b as would be installed to a hub (not shown) is provided. As shown, a first blade assembly 900a includes a respective fan blade 902a, a first platform member 904a arranged on a first side of the fan blade 902a, and a second platform member 906a attached a second side of the fan blade 902a. Similarly, a second blade assembly 900b includes a respective fan blade 902b, a first platform member 904b arranged on a first side of the fan blade 902b, and a second platform member 906b attached a second side of the fan blade 902b. When installed to a hub, the second platform member 906a of the first blade assembly 900a is arranged adjacent to the first platform member 904b of the second blade assembly 900b. As such, the second platform member 906a of the first blade assembly 900a and the first platform member 904b of the second blade assembly 900b define a flow path between the first fan blade 902a and the second fan blade 902b.

Because the first blade assembly 900a is separate from the second blade assembly 900b, a gap 944 is formed between the edges of the second platform member 906a of the first blade assembly 900a and the first platform member 904b of the second blade assembly 900b. To prevent ingestion of air between the blade assemblies 900a, 900b, a seal 946a may be provided to at least partially seal the gap 944. In this illustrative embodiment, the seal 946a is a flap seal that is under-mounted or fixed to a bottom (non-gaspath) surface of the second platform member 906a of the first blade assembly 900a. The seal 946a may be bonded or otherwise affixed to the second platform member 906a of the first blade assembly 900a. The seal 946a will engage with a bottom (non-gaspath) surface of the first platform member 904b of the second blade assembly 900b, thus sealing the gap 944 formed therebetween. As shown, the second platform member 906b of the second blade assembly 900b may also include a seal 946b that will sealingly engage with a first platform member of an adjacent blade assembly (not shown).

The first and second platform members 904a, 906a of the first blade assembly 900a are joined and connected to the first fan blade 902a by one or more fasteners 920a. Similarly, the first and second platform members 904b, 906b of the second blade assembly 900b are joined and connected to the second fan blade 902b by one or more fasteners 920b. The fasteners 920a are arranged to pass through ends of the first and second platform members 904a, 906a and a tab 924a of the first fan blade 902a to attach the platform members 904a, 906a to the first fan blade 902a. Similarly, the fasteners 920b are arranged to pass through ends of the first and second platform members 904b, 906b and a tab 924b of the second fan blade 902b to attach the platform members 904b, 906b to the second fan blade 902b.

Turning now to FIGS. 10-13, various different joining mechanisms for joining two platform members to a tab of a fan blade in accordance with embodiments of the present disclosure are shown.

Figure 10:
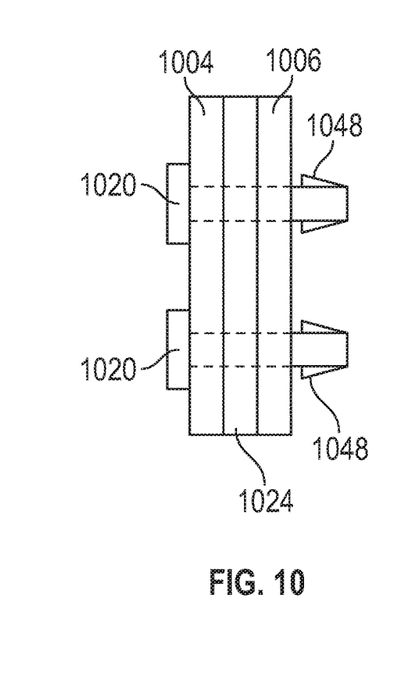
FIG. 10 is an illustration of an attachment configuration of a blade assembly in accordance with an embodiment of the present disclosure.

FIG. 10 illustrates an end of a first platform member 1004 and an end of a second platform member 1006 attached to a tab 1024 of a fan blade (e.g., as shown and described above). The elements are joined together by fasteners 1020. In this embodiment, the fasteners 1020 include snap ends 1048 on the fasteners 1020 (i.e., the fasteners 1020 are snap bolts in this embodiment). The snap ends 1048 provide for secure coupling of the end of the first platform member 1004, the end of the second platform member 1006, and the tab 1024.

Figure 11:
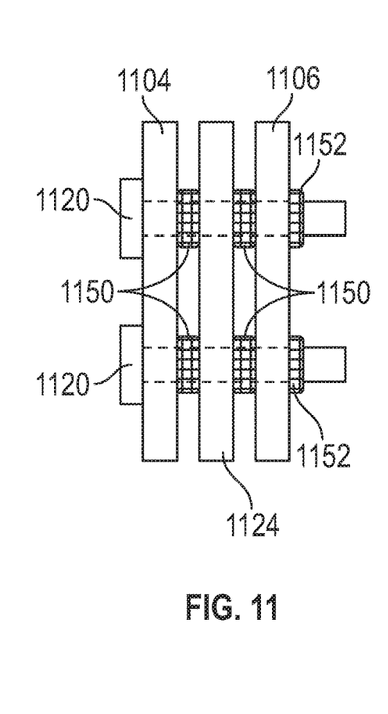
FIG. 11 is an illustration of an attachment configuration of a blade assembly in accordance with an embodiment of the present disclosure.

FIG. 11 illustrates an end of a first platform member 1104 and an end of a second platform member 1106 attached to a tab 1124 of a fan blade (e.g., as shown and described above). The elements are joined together by fasteners 1120. In this embodiment, the fasteners 1120 include preload washers 1150 between the adjacent elements 1104, 1124, 1106. Further, the fasteners 1120 include lock nuts 1152 on an end thereof, to provide secure coupling of the end of the first platform member 1104, the end of the second platform member 1106, and the tab 1124.

Figure 12:
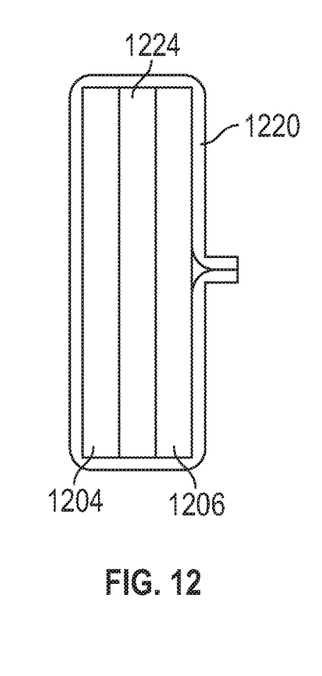
FIG. 12 is an illustration of an attachment configuration of a blade assembly in accordance with an embodiment of the present disclosure.

FIG. 12 illustrates an end of a first platform member 1204 and an end of a second platform member 1206 attached to a tab 1224 of a fan blade (e.g., as shown and described above). The elements are joined together by a fastener 1220. In this embodiment, the fastener 1220 is a metal band that is crimped and secures the elements together to provide secure coupling of the end of the first platform member 1204, the end of the second platform member 1206, and the tab 1224.

Figure 13:
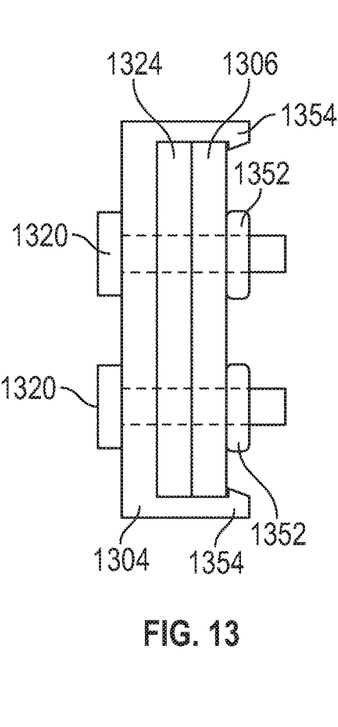
FIG. 13 is an illustration of an attachment configuration of a blade assembly in accordance with an embodiment of the present disclosure.

FIG. 13 illustrates an end of a first platform member 1304 and an end of a second platform member 1306 attached to a tab 1324 of a fan blade (e.g., as shown and described above). The elements are joined together by fasteners 1320 (having lock nuts 1352). In this embodiment, the end of the first platform member 1304 includes retention snap ends 1354. The retention snap ends 1354 of the end of the first platform member 1304 are configured to engage with the end of the second platform member 1306, and provide for secure coupling of the end of the first platform member 1304, the end of the second platform member 1306, and the tab 1324.

Advantageously, embodiments of the present disclosure provide for improved platform construction as compared to typical platforms for gas turbine engines. For example, embodiments of the present disclosure are directed to platform members that are mounted and affixed to fan blades such that a separate and distinct platform is not required to be designed, even when fan blade design is changed. Moreover, because the platform members may be arranged with a general geometry, such platform members may be employed on various different fan blade configurations, without requiring a complete redesign of such platform members.

Further, advantageously, because multiple different retention and attaching mechanisms may be employed in various embodiments, a reduced risk of foreign object damage from a platform member breaking or failing—i.e., the retention will retain the platform members to the fan blades proximate the root of the blades, even when a fan blade fails or breaks.

Further, advantageously, because the platform members may be attached to the fan blades prior to installation to a hub, assembly of the entire fan section of a gas turbine engine may be simplified. Specifically, there is no need to mount the platforms to the hub separately from the fan blades.

Furthermore, advantageously, because the platform members are mounted and affixed to the fan blades, fewer attachment points to a hub are required, thus reducing the number of design constraints.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower,"

"above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A blade assembly for a gas turbine engine, the blade assembly comprising:
   a fan blade having a leading edge, a trailing edge, a root, a tip, a first side, and a second side, the fan blade having a first tab extending from the leading edge proximate the root and a second tab extending from the trailing edge proximate the root;
   a first platform affixed to the first side of the fan blade at the first tab and the second tab and extending in a direction from the leading edge to the trailing edge along the first side; and
   a second platform affixed to the second side of the fan blade at the first tab and the second tab and extending in a direction from the leading edge to the trailing edge along the first side;
   at least one first fastener connecting the first platform, the first tab, and the second platform; and
   at least one second fastener connecting the first platform, the second tab, and the second platform.

2. The blade assembly of claim 1, wherein the fan blade defines a mounting region extending from the first tab to the second tab on each of the first side and the second side.

3. The blade assembly of claim 2, wherein a friction retention interface is formed between the fan blade at the mounting region and a contact surface of the first platform on the first side.

4. The blade assembly of claim 2, wherein a bonding retention interface is formed between the fan blade at the mounting region and a contact surface of the first platform on the first side.

5. The blade assembly of claim 4, wherein the bonding interface includes an epoxy to bond a material of the first platform member to the first side of the fan blade.

6. The blade assembly of claim 2, wherein the mounting region of the fan blade comprises a smooth surface.

7. The blade assembly of claim 2, wherein the mounting region of the fan blade comprises at least one rib configured to engage with a contact surface of the first platform member.

8. The blade assembly of claim 1, wherein at least one of (i) the first platform member defines a geometry different than a geometry of the first side of the fan blade such that a pre-load is defined by the first platform member and (ii) the second platform member defines a geometry different than a geometry of the second side of the fan blade such that a pre-load is defined by the second platform member.

9. The blade assembly of claim 1, further comprising a stiffening rib attached to the first platform member.

10. The blade assembly of claim 1, wherein the at least one first fastener is at least one of a bolt, a snap bolt, a preload washer, and a crimped metal band.

11. The blade assembly of claim 1, wherein an end of the first platform member proximate the first tab includes a retention snap end configured to engage with an end of the second platform member proximate the first tab such that the first tab is disposed between the end of the first platform member and the end of the second platform member.

12. The blade assembly of claim 1, further comprising a seal attached to at least one of the first platform member and the second platform member.

13. A gas turbine engine comprising:
    a hub; and
    a blade assembly mounted to the hub, wherein the blade assembly comprises:
       a fan blade having a leading edge, a trailing edge, a root, a tip, a first side, and a second side, the fan blade having a first tab extending from the leading edge proximate the root and a second tab extending from the trailing edge proximate the root;
       a first platform affixed to the first side of the fan blade at the first tab and the second tab and extending in a direction from the leading edge to the trailing edge along the first side; and
       a second platform affixed to the second side of the fan blade at the first tab and the second tab and extending in a direction from the leading edge to the trailing edge along the first side;
       at least one first fastener connecting the first platform, the first tab, and the second platform; and
       at least one second fastener connecting the first platform, the second tab, and the second platform.

14. The gas turbine engine of claim 13, further comprising a plurality of additional blade assemblies distributed about a circumference of the hub.

15. The gas turbine engine of claim 14, further comprising a seal attached to at least one of the first platform member and the second platform member, wherein the seal provides a seal between the blade assembly and an adjacent one of the plurality of additional blade assemblies.

16. The gas turbine engine of claim 13, wherein the fan blade defines a mounting region extending from the first tab to the second tab on each of the first side and the second side.

17. The gas turbine engine of claim 16, wherein at least one of (i) a friction retention interface is formed between the fan blade at the mounting region and a contact surface of the first platform on the first side and (ii) a bonding retention interface is formed between the fan blade at the mounting region and a contact surface of the first platform on the first side.

18. The gas turbine engine of claim 13, further comprising a stiffening rib attached to the first platform member.

19. The gas turbine engine of claim 13, wherein the at least one first fastener is at least one of a bolt, a snap bolt, a preload washer, and a crimped metal band.

20. The gas turbine engine of claim 13, wherein an end of the first platform member proximate the first tab includes a retention snap end configured to engage with an end of the second platform member proximate the first tab such that the first tab is disposed between the end of the first platform member and the end of the second platform member.

* * * * *